(12) United States Patent
Riley et al.

(10) Patent No.: US 8,186,900 B2
(45) Date of Patent: May 29, 2012

(54) PISTON ROD RETENTION SYSTEM

(75) Inventors: Andrew Dale Riley, Eufaula, OK (US); Randall Ferrain Weaver, Haywood, OK (US)

(73) Assignee: National-Oilwell, L.P., Houston, TX (US)

( * ) Notice: Subject to any disclaimer, the term of this patent is extended or adjusted under 35 U.S.C. 154(b) by 646 days.

(21) Appl. No.: 11/352,611

(22) Filed: Feb. 13, 2006

(65) Prior Publication Data

US 2006/0180020 A1      Aug. 17, 2006

Related U.S. Application Data (60) Provisional application No. 60/653,605, filed on Feb. 16, 2005.

(51) Int. Cl.
  *F16D 1/08* (2006.01)
  *F16D 3/80* (2006.01)
  *F16L 17/00* (2006.01)

(52) U.S. Cl. ............ 403/31; 403/119; 403/161; 92/134; 267/166

(58) Field of Classification Search ............... 403/2, 15, 403/31, 37, 38, 39, 41, 59, 60, 78, 119, 161, 403/223, 309, 162, 166, 313; 74/595, 606 R; 138/30, 31; 29/428, 516; 92/138, 17.1, 172, 92/134, 171, 171.1; 464/78; 267/166, 180; 175/51, 294, 321
See application file for complete search history.

(56) References Cited

U.S. PATENT DOCUMENTS

| | | | | |
|---|---|---|---|---|
| 1,397,377 A | * | 11/1921 | Harpham | 267/221 |
| 1,785,559 A | * | 12/1930 | Ponti | 175/321 |
| 1,819,532 A | * | 8/1931 | Wadsworth | 175/227 |
| 1,891,977 A | * | 12/1932 | Gould | 267/34 |
| 2,322,121 A | * | 6/1943 | Frank | 188/364 |
| 3,360,083 A | * | 12/1967 | Ayers, Jr. | 188/79.56 |
| 3,722,635 A | * | 3/1973 | Torii et al. | 188/79.54 |
| 5,123,446 A | * | 6/1992 | Haunhorst et al. | 137/614.02 |
| 5,149,286 A | * | 9/1992 | Tsujii | 440/61 R |
| 5,640,749 A | * | 6/1997 | Junkers | 29/446 |
| 5,802,670 A | * | 9/1998 | Bienek | 16/53 |
| 5,904,071 A | | 5/1999 | Kennedy et al. | |
| 5,996,632 A | * | 12/1999 | Vogel et al. | 138/31 |
| 6,024,124 A | * | 2/2000 | Braun et al. | 137/614.03 |
| 6,443,271 B2 | * | 9/2002 | Schmidt | 188/285 |

(Continued)

FOREIGN PATENT DOCUMENTS

DE    1264956    3/1968

(Continued)

OTHER PUBLICATIONS

EPO Search Report for Appln. No. 06250755.3; dated Aug. 5, 2006; (5 p.).

*Primary Examiner* — Daniel P. Stodola
*Assistant Examiner* — Nahid Amiri
(74) *Attorney, Agent, or Firm* — Conley Rose, P.C.

(57) ABSTRACT

A connector assembly comprising a housing and a tensile member disposed within the housing. The tensile member comprises first and second end portions. Each end portion sealingly engages the housing to form a hydraulic chamber therebetween. A first connector pivotally coupled to the first end portion. The axial position of the first connector relative to the housing is controlled by pressure within the hydraulic chamber.

19 Claims, 5 Drawing Sheets

U.S. PATENT DOCUMENTS

| | | | |
|---|---|---|---|
| 6,554,523 B2 * | 4/2003 | Aday et al. | 403/31 |
| 6,588,318 B2 * | 7/2003 | Aday et al. | 92/171.1 |
| 6,811,168 B2 * | 11/2004 | Acker et al. | 92/92 |
| 6,837,145 B1 * | 1/2005 | McBride et al. | 92/131 |
| 6,948,479 B1 * | 9/2005 | Raney et al. | 123/456 |
| 2002/0159823 A1 | 10/2002 | Aday et al. | |

FOREIGN PATENT DOCUMENTS

| | | |
|---|---|---|
| GB | 1572632 | 7/1980 |
| GB | 2190170 | 11/1987 |

* cited by examiner

PISTON ROD RETENTION SYSTEM

CROSS-REFERENCE TO RELATED APPLICATIONS

The present application claims priority to U.S. Provisional Application No. 60/653,605, filed Feb. 16, 2005, and titled "Hydraulic Self-Aligning Piston Rod Retention System," which is hereby incorporated by reference herein for all purposes.

STATEMENT REGARDING FEDERALLY SPONSORED RESEARCH OR DEVELOPMENT

Not applicable.

BACKGROUND OF THE INVENTION

Embodiments of the present invention relate to reciprocating equipment, particularly high-pressure mud pumps used in the oil production industry. More particularly, embodiments of the present invention relate to a novel method and apparatus for coupling components used in reciprocating equipment, such as mud pumps.

High pressure mud pumps commonly found in the oil production industry are generally large reciprocating pumps. The components of a mud pump can be divided into a power end and a fluid end. The power end components comprise a plurality of reciprocating connecting rods and crossheads connected to a rotating crankshaft. The fluid end components comprise a plurality of piston and cylinder assemblies along with the valves needed to control the flow of fluid into and out of the cylinders. In many pumps, an extension rod extends from each crosshead and is coupled to a piston via a piston rod. The power end serves to convert rotational motion of the crankshaft into a linear, reciprocating motion of the pistons within the cylinders. The reciprocating motion of the pistons generates pressurized fluid.

The drilling fluid pressurized by the mud pump often contains a high volume of solid material and can be highly abrasive. When operating with high pressure, abrasive fluid, mud pumps tend to have very high wear rates, especially in the fluid end components, such as the pistons. Because high pressure mud pumps experience high wear rates on pistons and other components, it is often necessary to replace the components on a regular basis. When replacing these components, the mud pump must necessarily be deactivated, which often results in interruption of the drilling process. Therefore, in order reduce downtime, it beneficial to be able to remove and replace worn components quickly and efficiently.

In many mud pump designs, the piston rods, which connect to the pistons, are connected to the extension rods via retention apparatus, such as piston rod clamps or links. These piston rod clamps can simplify the removal and replacement of a piston. Because field conditions are frequently less than ideal, and the components wear during operation, there is often some degree of misalignment between the reciprocating components. This misalignment can lead to complications and delays in installing a conventional piston rod clamp and making the connection between an extension rod and a piston rod. Therefore, there exists a need for a retention apparatus which allows for an efficient replacement of worn pistons and other high wear components while accommodating misalignment between the mud pump components, such as the extension rod and the piston rod.

Thus, the embodiments of the present invention are directed to piston rod retention systems that seek to overcome these and other limitations of the prior art.

SUMMARY OF THE PREFERRED EMBODIMENTS

Embodiments of the present invention include methods and apparatus comprising a connector assembly comprising a housing and a tensile member disposed within the housing. The tensile member comprises first and second end portions. Each end portion sealingly engages the housing to form a hydraulic chamber therebetween. A first connector is pivotally coupled to the first end portion. The axial position of the first connector relative to the housing is controlled by pressure within the hydraulic chamber.

In certain embodiments a rod retention system comprises a connector assembly having a tensile member disposed within a housing. The tensile member has first and second end portions that sealingly engage the housing to form a hydraulic chamber therebetween. A first connector is coupled to the first end portion and disposable within a first receptacle disposed within a first rod. A second connector is coupled to the second end portion and disposable within a second receptacle disposed with a second rod. The first and second connectors are coupled to the tensile member so as to pivot or swivel with respect to the tensile member in order to compensate for misalignment of the connector assembly and the first and second rods. The axial distance between the first connector and the second connector is controlled by pressure within the hydraulic chamber.

Thus, the embodiments of present invention comprise a combination of features and advantages that enable substantial enhancement of rod retention systems. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Figure 1:
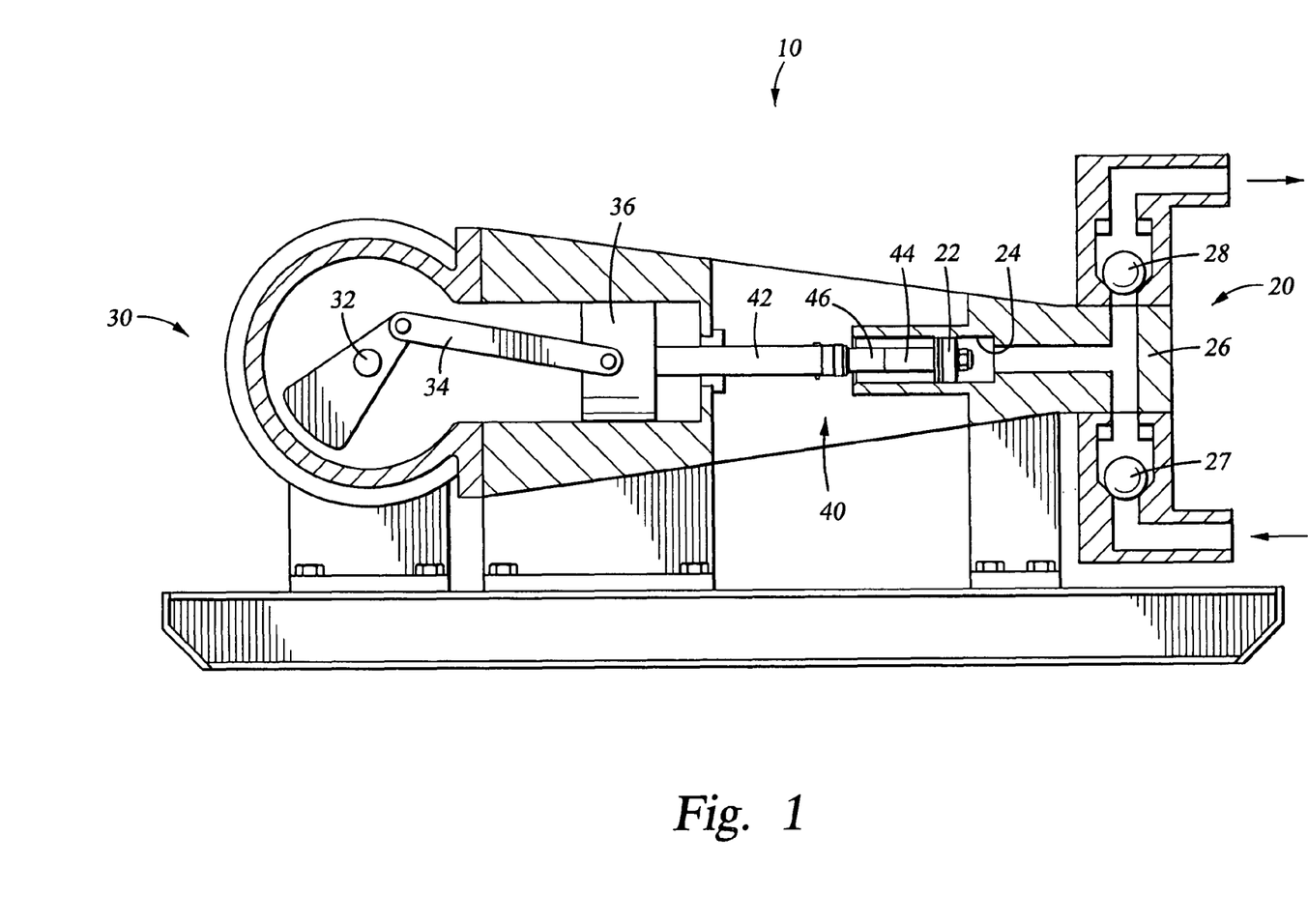
FIG. 1 is a partial sectional view of a mud pump comprising a rod retention system constructed in accordance with embodiments of the invention.

Referring now to FIG. 1, mud pump 10 comprises fluid end 20 and power end 30. Fluid end 20 comprises piston 22, cylinder liner 24, module 26, intake valve 27, and outlet valve 28. Power end 30 comprises crankshaft 32, connecting rod 34, and crosshead 36. Fluid end 20 is coupled to power end 30 by retention system 40. Retention system 40 comprises extension rod 42, piston rod 44, and connector assembly 46. Extension rod 42 connects to crosshead 36 and is coupled, via connector assembly 46 to piston rod 44, which connects to piston 22. Piston 22 is removed from pump 10 by disconnecting connector assembly 46 so as to decouple piston rod 44 from extension rod 42.

Figures 2, 3:
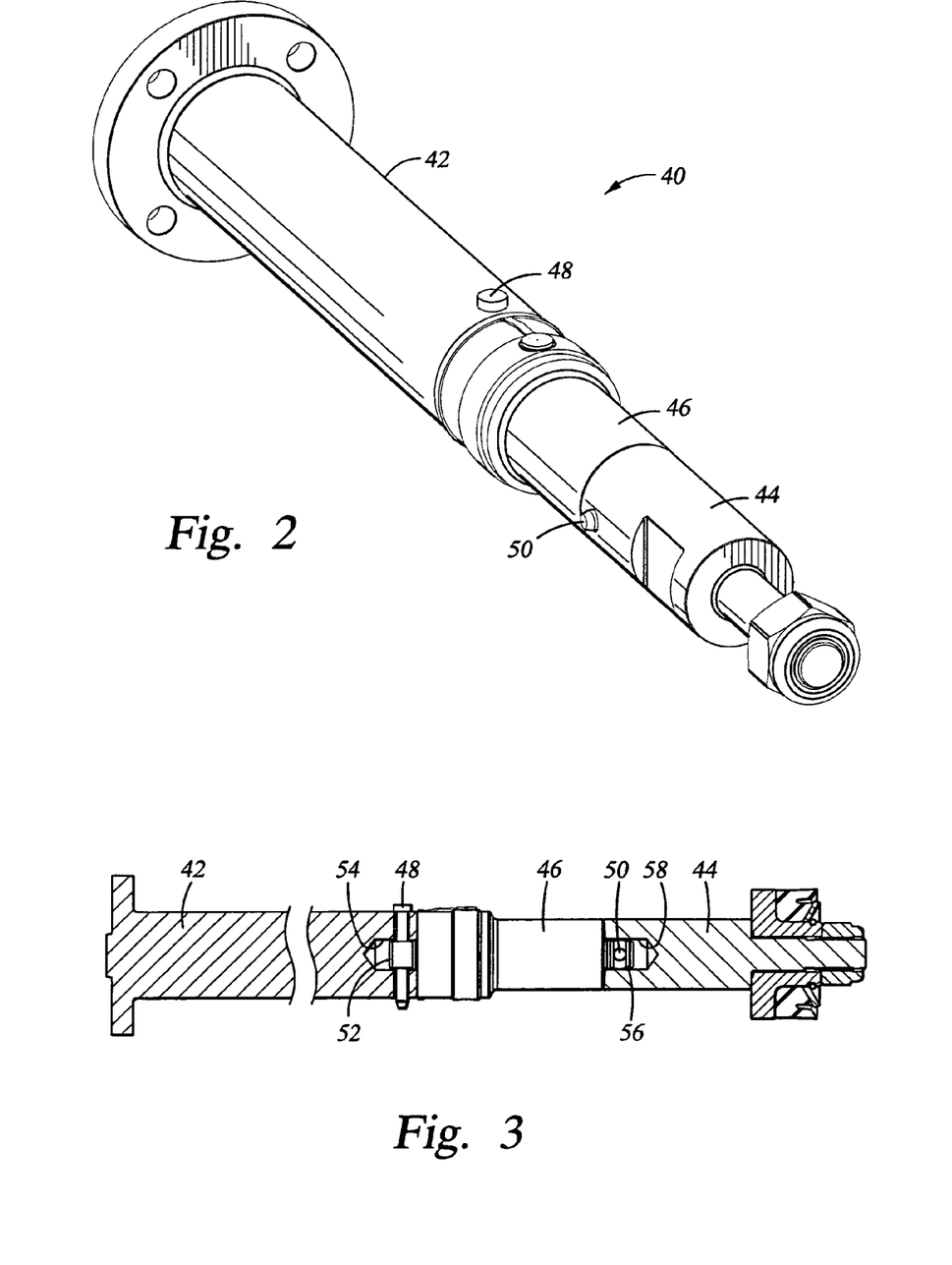
FIG. 2 is an isometric view of a rod retention system constructed in accordance with embodiments of the invention.
FIG. 3 is a partial sectional view of the rod retention system of FIG. 2.

Retention system 40 is shown in more detail in FIGS. 2 and 3. Retention system 40 further comprises pins 48 and 50. Connector assembly 46 comprises end connectors 52 and 56 that interface with receptacles 54 and 58 on extension rod 42 and piston rod 44, respectively. The interfaces between connectors 52 and 56 and their respective receptacles 54 and 58 are configured so as to compensate for misalignment between rods 42, 44 and connector assembly 46 during the assembly of retention system 40. Pin 48 engages connector 52 and receptacle 54 so as to couple extension rod 42 to connector assembly 46. Pin 50 engages connector 56 and receptacle 58 so as to couple connector assembly 46 to piston rod 44. Each pin allows its associated connector to rotate about the pin's longitudinal axis so as to compensate for misalignment in a plane that is parallel to the longitudinal axis. Therefore, pins 48 and 50 are arranged perpendicular to each other so as to allow misalignment in more than one plane.

Figure 4:
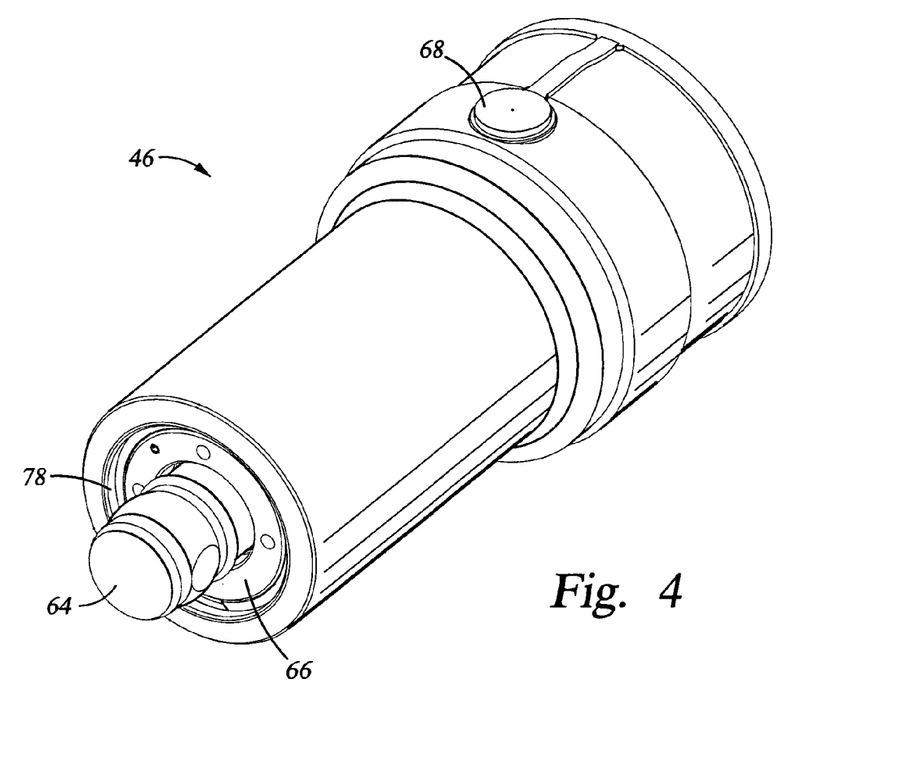
FIG. 4 is an isometric view of a connector assembly constructed in accordance with embodiments of the invention.
Figure 5:
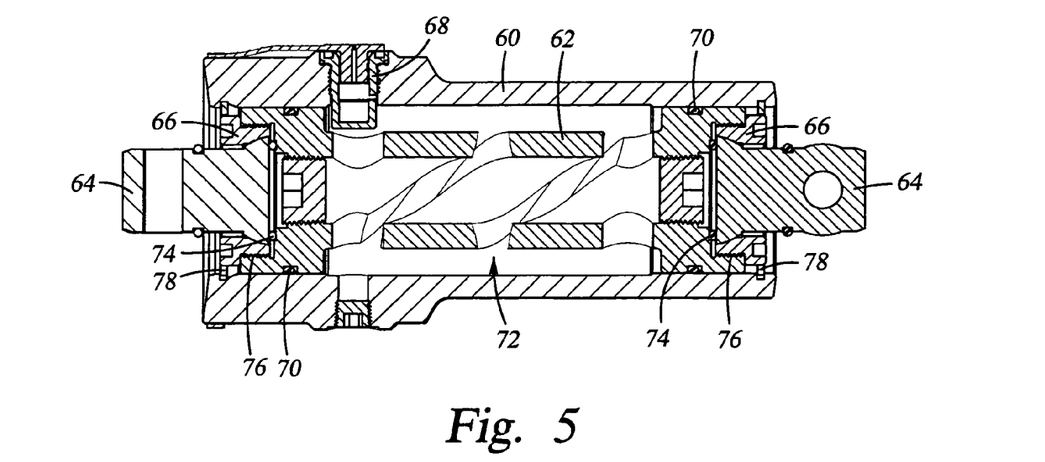
FIG. 5 is a partial sectional view of the connector assembly of FIG. 4.

One embodiment of connector assembly 46 is shown in FIGS. 4 and 5. Connector assembly 46 comprises housing 60, tensile member 62, swivel connectors 64, spherical sockets 66, and hydraulic fitting 68. Tensile member 62 is disposed within housing 60 with seals 70 sealingly engaged with the housing to form hydraulic chamber 72. Hydraulic fitting 68 is disposed within the wall of housing 60 and provides fluid communication with hydraulic chamber 72.

A swivel connector 64 is disposed on each end of tensile member 62. Compliant member 74 is disposed between swivel connector 64 and tensile member 62. Spherical socket 66 is coupled to tensile member 62 via threaded connection 76. Spherical socket 66 engages swivel connector 64 and allows the swivel connector to pivot or swivel relative to tensile member 62 and housing 60. Retaining rings 78 engage housing 60 limit the axial translation of tensile member 62.

Figure 6:
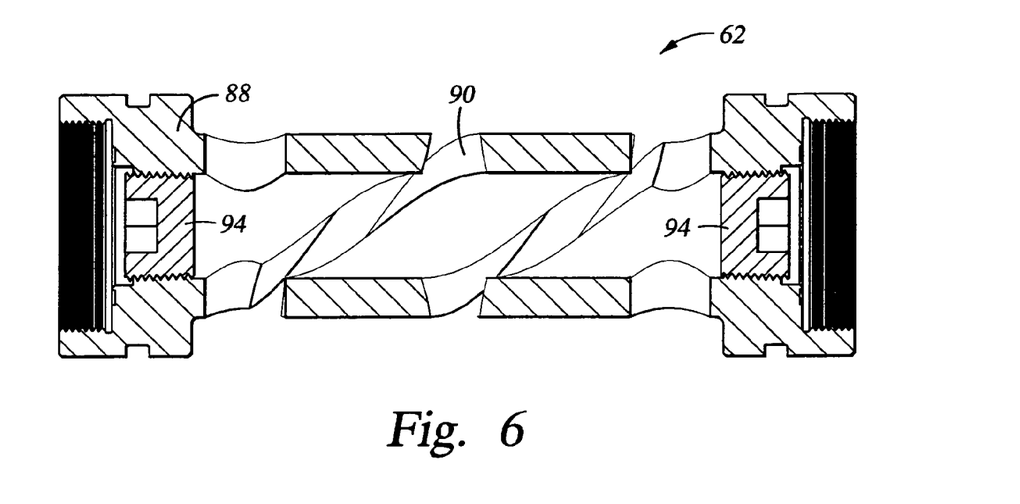
FIG. 6 is a partial sectional view of a tensile member constructed in accordance with embodiments of the invention.

Referring now to FIG. 6, tensile member 62 may be formed from a unitary tubular member 88 having a helical slot 90. Slot 90 penetrates the wall of tubular member 88 so as to reduce the axial strength and allow the tubular member to expand in response to an axial load as well as provide sufficient resiliency to create the desired loads on the connected components. The open ends 92 of tubular member 88 can be sealed by plugs 94. In other embodiments, slot 90 may be replaced by other wall penetrations. Tensile member 62 may also be formed from solid bar material that has a sufficient strength and flexibility to allow axial expansion. In certain embodiments, the diameter of the bar material could be reduced in selected regions to achieve the desired expansion and resiliency.

Figure 7:
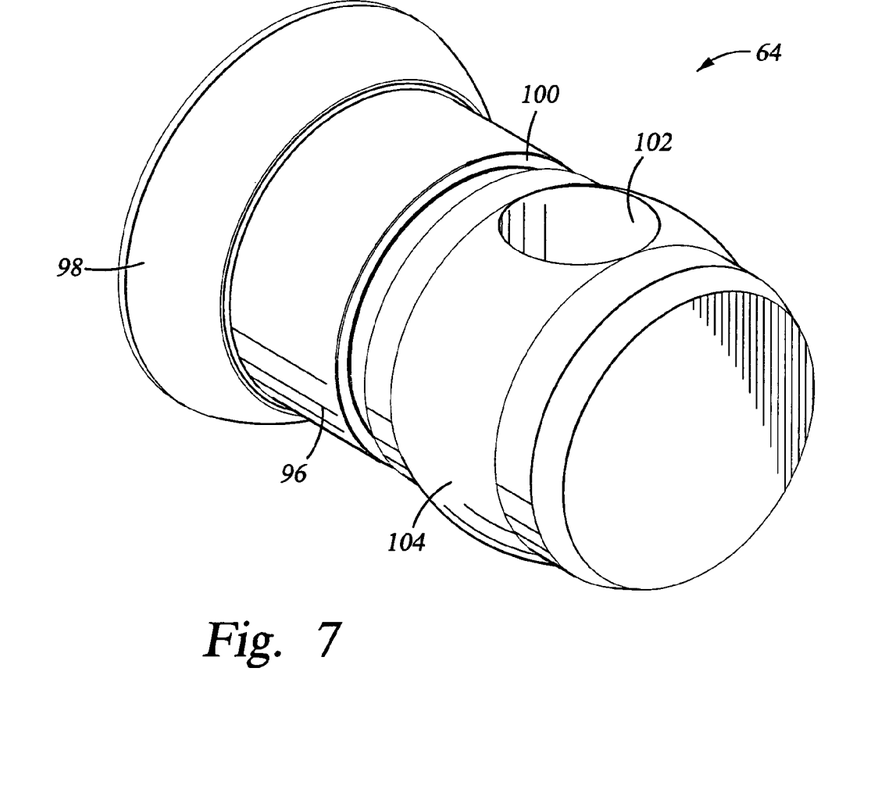
FIG. 7 is an isometric view of a swivel connector constructed in accordance with embodiments of the invention.

Referring now to FIG. 7, swivel connector 64 comprises body 96 having spherical base 98, groove 100, pin receptacle 102, and spherical pilot diameter 104. Pin receptacle 102 has a longitudinal axis that intersects the center of curvature of spherical pilot diameter 104. Spherical base 98 and spherical pilot diameter 104 allow swivel connector 64 to move in response to misalignment between mating components. In certain embodiments, a swivel connector could be formed with cylindrical surfaces or other curved surfaces to provide for misalignment in particular planes or directions.

In order to assemble connector assembly 46, as shown in FIG. 5, pipe plugs 94 (or other suitable sealing means) are threaded into each end of tensile member 62. A swivel connector 64 and resilient member 74 are then placed at each end of tensile member 62. A spherical socket 66 is threaded onto each end of tensile member 62 to retain swivel connector 64. As previously described, swivel connectors 64 and spherical sockets 66 have mating surfaces that are rounded, spherical, or otherwise formed with mating curved surfaces that allow the swivel connector to pivot or swivel relative to tensile member 62. After the ends of tensile member 62 have been sealed and swivel connectors 64 installed, these components are installed into housing 60 along with seals 70.

To install tensile member 62, a retaining ring 78 is installed in a groove in one end of housing 60. Tensile member 62 is then slid into housing 60 from the opposite end of the installed retaining ring 78. After tensile member 62 and its associated components are installed into housing 60, a second retaining ring 78 is installed on the other end of the housing so as to secure the tensile member within the housing. The assembly is completed by the installation of hydraulic fitting 68.

To operate connector assembly 46, a hydraulic fluid source, such as a pump, is coupled to hydraulic fitting 68 such that the fluid source is in fluid communication with hydraulic chamber 72. Tensile member 62 will elongate axially in response to the application of pressurized hydraulic fluid to hydraulic chamber 72. In certain embodiments, a hydraulic fluid pressure of 3000 psi may be applied to hydraulic chamber 72. The elongation of tensile member 62 increases the extension of swivel connectors 64 from housing 60 of connector assembly 46. Therefore, the axial position of swivel connectors 64 relative to housing 60 is dependent on the pressure within hydraulic chamber 72.

Connector assembly 46 is constructed such that, when hydraulic chamber 72 is not pressurized (as shown in FIG. 5), the distance between the receptacles in swivel connectors 64 is less than the distance between the corresponding receptacles in the piston rod 44 and the extension rod 46 when the rods contact housing 60 (as shown in FIG. 2). Thus, pressurization of hydraulic chamber 72 is utilized to stretch tensile member 62 and allow the receptacles of swivel connectors 64 to become aligned with the corresponding receptacles in the connected rods.

Thus, connector assembly 46 is pressurized to stretch tensile member 62 and allow swivel connectors 64 to become axially aligned with the receptacles in the piston rod and extension rod. This is accomplished by removing inserting a hydraulic nozzle (not shown) into hydraulic fitting 68 (see FIG. 5). The hydraulic nozzle can then be connected to a hydraulic pump, or other pressurized fluid source, and hydraulic chamber 72 of connector assembly 46 pressurized. In certain embodiments, the assembly will be pressurized to a maximum of 3,000 psi. A relief valve in the nozzle assembly may be used to prevent overpressurization of the connector assembly 46.

Figure 8:
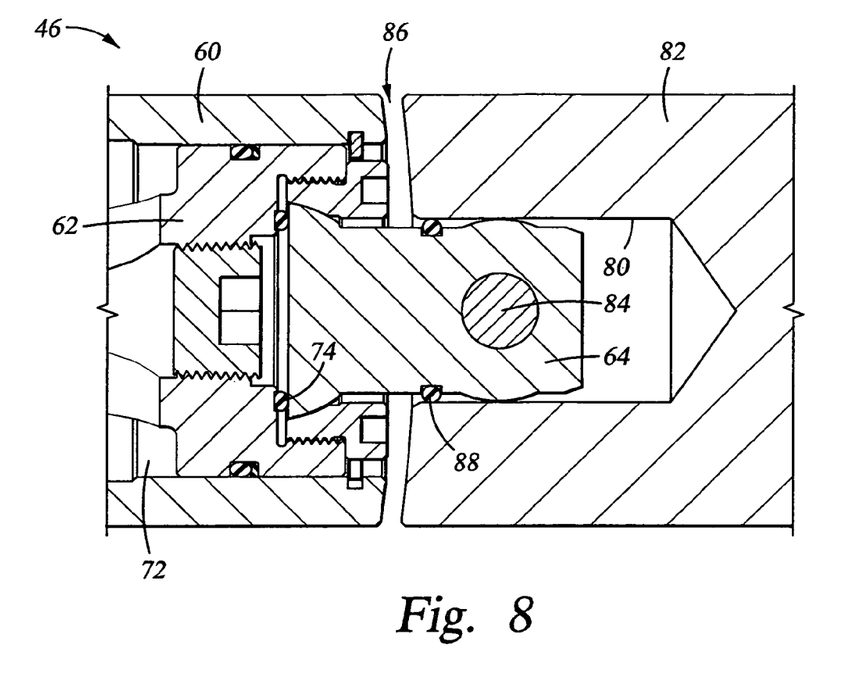
FIG. 8 is a partial sectional view showing a connector assembly in an installation position.

FIG. 8 illustrates one end of connector assembly 46 in an installation position where hydraulic chamber 72 has been pressurized. It is understood that both ends of connector assembly will operate in substantially the same manner and substantially in unison. In certain embodiments, it may be possible to connect one end of connector assembly 46 without pressurizing the system, but pressurization is required to connect both ends. In FIG. 8, receptacle 80 and rod 82 are used to generically describe any rod to which the connector assembly is attached. For example, receptacle 80 and rod 82 may be, for example, a piston rod or an extension rod as described above Pressurized fluid in hydraulic chamber 72 causes tensile member 62 to elongate. The elongation of tensile member 62 extends swivel connector 64 from housing 60. The extended swivel connector 64 is inserted into receptacle 80 of rod 82. Once the through holes in rod 82 and swivel connector 64 are axially aligned pin 84 is inserted to couple swivel connector 64 to rod 82.

The extension of swivel connector 64 creates a gap 86 between housing 60 of connector assembly 46 and rod 82. Gap 86 allows swivel connector 64 to compensate for misalignment between connector assembly 46 and rod 82. Swivel connector 64 can rotate within receptacle 80 about the longitudinal axis of pin 84. As discussed above, since each swivel connector 64 can only rotate about the longitudinal axis of its respective pin 84, the swivel connector and pins on opposite ends of connector assembly 46 should be oriented perpendicular to each other so as to allow compensation of misalignment in more than one plane.

As swivel connector 64 moves relative to receptacle 80, compliant member 88 is compressed between the connector and the receptacle and helps center the connector within the receptacle. Swivel connector 64 can also rotate relative to tensile member 62 along the spherical interface between the connector and spherical socket 66. Compliant member 74 is compressed between swivel connector 64 and tensile member 62 as the swivel connector moves and helps return the swivel connector to its original position relative to the swivel connector.

The flexibility of swivel connector 64 allows the swivel connector to move in response to misalignment between the connector assembly 46 and rod 82, which makes it easier to align the holes through the swivel connector and the rod so that pin 84 can be easily installed. Once pin 84 is installed, the connection between connector assembly 46 and rod 82 is completed by relieving the pressure within hydraulic chamber 72. As the pressure within hydraulic chamber 72 is reduced, tensile member 62 will axially contract, drawing swivel connector 64 toward housing 60.

Figure 9:
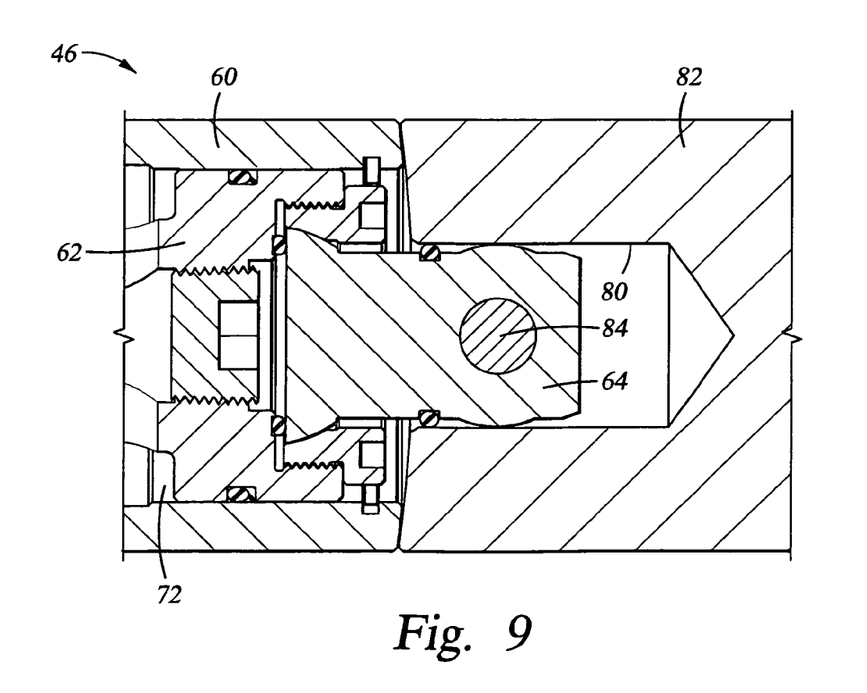
FIG. 9 is a partial sectional view showing a connector assembly in an operating position.

As shown in FIG. 9, the contraction of tensile member 62 draws rod 82 toward connector assembly 46 such that gap 86 (see FIG. 8) closes and the rod bears against housing 60. As rod 82 contacts housing 60, the continued contraction of tensile member 62 imparts a shear load on pin 84. This shear load on pin 84 maintains the connection between rod 82 and connector assembly 46 during reciprocal motion.

To disconnect rod 82 from connector assembly 46, a pressurized fluid source is hydraulically coupled to hydraulic fitting 68 such that the fluid source is in fluid communication with hydraulic chamber 72. Tensile member 62 will elongate axially in response to the application of pressurized hydraulic fluid to hydraulic chamber 72. The elongation of tensile member 62 increases the extension of swivel connectors 64 from housing 60 of connector assembly 46, releasing the loads on pins 84. Once pins 84 are unloaded, they can be removed, thus disconnecting rod 82 from swivel connector 46.

Disclosed within is a novel method and apparatus for retaining components in reciprocating equipment such as mud pumps used in earthen drilling operations. Among the numerous advantages of this retention apparatus is the ability to accommodate some degree of misalignment among the components to which it is connected. The apparatus accomplishes this by incorporating mating surfaces between components which have surfaces that are rounded or formed with a spherical radius. In addition, the two retaining pins that connect the retention apparatus to the adjacent components (i.e., the extension rod and piston rod) are oriented at 90 degrees from each other. This allows the retention apparatus to accommodate misalignment in multiple planes. Other advantages of the apparatus include the ability to connect and disconnect components with lower hydraulic pressures than are typically necessary in prior art, hydraulically actuated devices.

While preferred embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, the relative dimensions of various parts, the materials from which the various parts are made, and other parameters can be varied. In addition, use of the term "between" when describing the location of a component should not be construed such that the component must be directly contacting the adjacent members. Furthermore, other embodiments may incorporate different configurations than the tensile member disclosed above, including the use of compression springs that act on surfaces to reduce the distance between the swivel connectors. Accordingly, the scope of protection is not limited to the embodiments described herein, but is only limited by the claims that follow, the scope of which shall include all equivalents of the subject matter of the claims.

What is claimed is:

1. A connector assembly comprising:
    a housing having a central axis;
    a tensile member disposed within said housing, wherein the tensile member has a first end portion slidingly engaging the housing and a second end portion opposite the first end portion and slidingly engaging the housing, wherein the first end portion and the second end portion each sealingly engage said housing to form a hydraulic chamber within the housing between the first end portion and the second end portion of the tensile member; and
    a first connector pivotally coupled to the first end portion of the tensile member, wherein the first connector comprises a body with a first pin receptacle extending through the body and intersecting a longitudinal centerline of the body;
    wherein the tensile member is configured to increase in axial length in response to an increase in fluid pressure within the hydraulic chamber.

2. The connector assembly of claim 1 further comprising a socket that pivotally couples said first connector to the first end portion.

3. The connector assembly of claim 1 wherein said tensile member comprises a tubular body.

4. The connector assembly of claim 3 wherein said tensile member further comprises a spiral groove extending radially through said tubular body and axially positioned between the first end portion and the second end portion.

5. The connector assembly of claim 1 wherein the body of the first connector has a first end proximal the tensile member and a second end distal the tensile member and extending from the housing;
   wherein said first connector further comprises:
      a base at the first end of the body and having a curved surface; and
      wherein the pin receptacle has a longitudinal axis that is perpendicular to the longitudinal centerline of said body.

6. The connector assembly of claim 5 wherein said first connector further comprises a spherical shoulder disposed circumferentially about said body between the base and the second end of the body, wherein said spherical shoulder has a center of curvature disposed along the longitudinal axis of said first pin receptacle.

7. The connector assembly of claim 1 further comprising a second connector pivotally coupled to the second end portion.

8. The connector assembly of claim 7 wherein said second connector comprises a second pin receptacle that is perpendicular to said first pin receptacle disposed on said first connector.

9. The connector assembly of claim 1, further comprising a retaining ring coupled within said housing and configured to limit axial translation of said tensile member.

10. A rod retention system comprising:
    a connector assembly comprising a tensile member disposed within a housing having a central axis, wherein the tensile member has a first end portion axially moveable relative to the housing and a second end portion axially moveable relative to the housing and the first end portion, wherein the first end portion and the second end portion each sealingly engage the housing to form a hydraulic chamber within the housing between the first end portion and the second end portion;
    a first connector coupled to the first end portion and disposed within a first receptacle in a first rod;
    a second connector coupled to the second end portion and disposed within a second receptacle in a second rod, wherein the first connector and the second connector are each configured to pivot or swivel with respect to the tensile member to compensate for misalignment of said connector assembly and the first and second rods, and wherein the tensile member is configured to increase the axial distance between said first connector and said second connector in response to an increase in fluid pressure within the hydraulic chamber;
    a first pin that engages said first connector and the first receptacle; and
    a second pin that engages said second connector and the second receptacle.

11. The rod retention system of claim 9 wherein said first pin is perpendicular to said second pin.

12. The rod retention system of claim 9 wherein the tensile member comprises a tubular body.

13. The rod retention system of claim 12 wherein the tensile member further comprises a spiral groove extending radially through the tubular body and axially positioned between the first end portion and the second end portion.

14. The connector assembly of claim 12, further comprising a plug inserted within each end of said tensile member.

15. The rod retention system of claim 10 wherein the body of the first connector has a first end proximal the tensile member and a second end distal the tensile member and extending from the housing;
    wherein said first connector comprises:
       a base at the first end of the body and having a curved surface; and
       a pin receptacle extending through said body, wherein said pin receptacle has a longitudinal axis that is perpendicular to a longitudinal centerline of said body.

16. The rod retention system of claim 15 wherein said first connector further comprises a spherical shoulder disposed circumferentially about said body between the base and the second end of the body, wherein said spherical shoulder has a center of curvature disposed along the longitudinal axis of said pin receptacle.

17. The rod retention system of claim 10, further comprising a first socket that pivotally couples said first connector to the first end portion.

18. The rod retention system of claim 17, wherein the first socket comprises a mating surface configured to engage a mating surface on said first connector, wherein each of the mating surfaces is curved.

19. The rod retention system of claim 10, further comprising a compliant member disposed between the first connector and the tensile member.

* * * * *